US012182640B2

(12) United States Patent
Sarala et al.

(10) Patent No.: US 12,182,640 B2
(45) Date of Patent: Dec. 31, 2024

(54) FLEXIBLE COMMUNICATION-DEVICE MANAGEMENT VIA MULTIPLE USER INTERFACES

(71) Applicant: Ruckus IP Holdings LLC, Claremont, NC (US)

(72) Inventors: Suneetha Sarala, Fremont, CA (US); Tian Lei, San Jose, CA (US); Jane Joseph, Leander, TX (US); Renjith Kumar Ponnappan, Fremont, CA (US); Andrew Persaud, San Jose, CA (US); Sushant Gaurav, Bangalore (IN)

(73) Assignee: Ruckus IP Holdings LLC, Claremont, NC (US)

(*) Notice: Subject to any disclaimer, the term of this patent is extended or adjusted under 35 U.S.C. 154(b) by 0 days.

(21) Appl. No.: 18/506,096

(22) Filed: Nov. 9, 2023

(65) Prior Publication Data
US 2024/0152415 A1    May 9, 2024

Related U.S. Application Data

(63) Continuation of application No. 17/688,946, filed on Mar. 8, 2022, now abandoned.

(60) Provisional application No. 63/161,482, filed on Mar. 16, 2021, provisional application No. 63/158,910, filed on Mar. 10, 2021.

(51) Int. Cl.
G06F 9/54        (2006.01)
H04L 41/0213     (2022.01)
H04L 67/133      (2022.01)

(52) U.S. Cl.
CPC .............. *G06F 9/546* (2013.01); *G06F 9/547* (2013.01); *H04L 41/0213* (2013.01); *H04L 67/133* (2022.05)

(58) Field of Classification Search
CPC .......... G06F 9/546; G06F 9/547; G06F 9/541; H04L 41/0213; H04L 67/133
See application file for complete search history.

(56) References Cited

U.S. PATENT DOCUMENTS 6,708,207 B1 *   3/2004   Sabelhaus ............. H04L 41/046
                                                          709/224
2017/0331669 A1 * 11/2017 Ganesh ............... H04L 41/0226
2019/0207801 A1 *  7/2019 Kim ..................... H04L 41/046

* cited by examiner

*Primary Examiner* — Bryan Y Lee
(74) *Attorney, Agent, or Firm* — Steven Stupp

(57) ABSTRACT

A computer network device (such as an access point, a switch or a router) that has multiple user interfaces is described. During operation, the computer network device may execute program instructions for the user interfaces and a shared messaging module, where a given user interface includes an agent corresponding to an application. When a message associated with the application is received via a user interface in the user interfaces, the corresponding agent in the user interface may extract a command or operation from the message. Then, the shared messaging module may translate the command or operation into a common format of the application. Moreover, the shared messaging module may provide (or route) the translated command or operation addressed to the application via a single communication path associated with the application and the agents for the application in the user interfaces.

20 Claims, 9 Drawing Sheets

FLEXIBLE COMMUNICATION-DEVICE MANAGEMENT VIA MULTIPLE USER INTERFACES

CROSS REFERENCE TO RELATED APPLICATIONS

This application is a Continuation of U.S. Non-Provisional application Ser. No. 17/688,946, "Flexible Communication-Device Management Via Multiple User Interfaces," filed on Mar. 8, 2022, which claims priority under 35 U.S.C. 119(e) to: U.S. Provisional Application Ser. No. 63/161,482, "Transposing and Exchanging User-Interface Commands," filed on Mar. 16, 2021, by Sushant Gaurav et al., and U.S. Provisional Application Ser. No. 63/158,910, "Flexible Communication-Device Management Via Multiple User Interfaces," filed on Mar. 10, 2021, by Suneetha Sarala et al., the contents of each of which are herein incorporated by reference.

FIELD

The described embodiments relate to techniques for consistent configuration and monitoring of a computer network device via multiple user interfaces.

BACKGROUND

Computer network devices, such as switches, routers and/or access points, are often concurrently managed by multiple management entities using different user interfaces. For example, a computer network device may be managed using: a simple network management protocol (SNMP)-based external network management system (NMS) device, an external NMS device that is based on a proprietary user interface, and/or an application programming interface (API)-based script that uses a protocol such as representational state transfer (REST) Conf or RESTConf (which may be Internet Protocol-based), an element management system (such as a web-based user interface) and/or a command line interface (e.g., a text-based command entry interface). In principle, at a given time, the configuration and monitoring of the computer network device may be performed using any of these user interfaces.

In practice, it is often challenging to support multiple user interface. For example, a single user interface is often selected as the base user interface with an associated data model (such as YANG), and the remaining user interfaces are typically layered over or on top of the base user interface. Notably, commands from the remaining user interfaces may be translated into commands associated with the base user interface before they can be executed. However, this approach is typically hierarchical and inflexible. For example, configuration parameters may need to specified in a predefined order of the base-user-interface data model, which may be cumbersome or inconvenient for the remaining interfaces. In addition, it may be time consuming and expensive to add support for another user interface.

SUMMARY

In a first group of embodiments, a computer network device that has multiple user interfaces is described. This computer network device may include: an interface circuit; a processor; and a memory that stores program instructions for the user interfaces and a shared messaging module, where, when executed by the processor, the program instructions cause the computer network device to perform operations. Notably, during operation, the computer network device executes the program instructions for the user interfaces and the shared messaging module, where a given user interface includes an agent corresponding to an application. When a message associated with the application is received via a user interface in the user interfaces, the corresponding agent in the user interface extracts a command or operation from the message. Then, the shared messaging module translates the command or operation into a common format of the application. Moreover, the shared messaging module provides the translated command or operation addressed to the application via a single communication path associated with the application and the agents for the application in the user interfaces.

Note that the external communication with the user interfaces may include non-inter-process communication, and the communication between the shared messaging module and at least the application may include inter-process communication.

Moreover, the computer network device may include: an access point, a switch, or a router.

Furthermore, the application may be associated with configuration and/or monitoring of the computer network device. Note that the application may be executed by a computer or a computer system.

Additionally, when there are multiple applications, the given user interface may include multiple agents corresponding to the applications.

In some embodiments, instances of the command or the operation in messages received via different user interfaces may be indistinguishable from each other after translation into the common format by the shared messaging module. Consequently, the application may be unaware which of the user interfaces provided the command or the operation.

Moreover, the common format may not be based on a data model associated with one of the user interfaces.

Furthermore, the user interfaces may include one or more of: a command line interface, a web-based user interface, RESTConf, or a simple network management protocol (SNMP) interface.

Another embodiment provides the computer or the computer system.

Another embodiment provides a computer-readable storage medium for use with the computer network device. When executed by the computer network device, this computer-readable storage medium causes the computer network device to perform at least some of the aforementioned operations.

Another embodiment provides a method, which may be performed by the computer network device. This method includes at least some of the aforementioned operations.

In a second group of embodiments, a computer system that transposes and exchanges user-interface messages is described. This computer system may include: an interface circuit; a processor; and a memory that stores program instructions for a user interface and a messaging module, where, when executed by the processor, the program instructions cause the computer system to perform operations. Notably, during operation, the computer system receives, via the user interface, a message (such as a command) associated with a computer, where the message has a format associated with the user interface and includes one or more key-value pairs. Then, the computer system extracts one or more first keys from the one or more key-value pairs in the message. Moreover, the computer system performs a search of a predefined key data structure based at least in part on a search expression corresponding to the one or more first keys, where the predefined key data structure includes a set of first keys associated with the user interface and a corresponding set of predetermined application programming interfaces (APIs) that encode first key-value pairs in messages as output messages, and where the output messages have different formats from the messages. When a match for a given first key in the one or more first keys is found in the predefined key data structure, the computer system generates, using an API corresponding to the given first key, an output message that includes the given first key and a given first value in a given key-value pair of the given first key in the message. Next, the computer system provides the output message.

Note that the computer system may include one or more electronic devices. In some embodiments, the computer system includes a computer network device, such as a switch or a router in a network.

Moreover, the user interface may include a command line interface (CLI).

Furthermore, the search expression may include a protocol buffer that includes the one or more first keys. Note that the protocol buffer may be associated with the user interface or the message.

Additionally, the computer system generates the output message by associating the protocol buffer with a new or a pre-existing output message. In some embodiments, the output message may be a type of message corresponding to a type of the protocol buffer.

Note that the output message may be provided to an application, executed by the computer system, which configures or monitors a computer network device, such as a router or a switch in a network.

Moreover, the computer system may receive, via a second user interface, a second message having a second format associated with the second user interface, where the second message includes one or more second key-value pairs. Then, the computer may extract one or more second keys from the one or more second key-value pairs in the second message based at least in part on the one or more second keys. Furthermore, the computer system performs a second search of a second predefined key data structure based at least in part on a second search expression corresponding to the one or more second keys, where the second predefined key data structure includes second keys associated with the second user interface and a corresponding set of second predetermined APIs that encode second key-value pairs in second messages as second output messages, and where the second output messages have different formats from the second messages. When a match for a given second key in the one or more second keys is found in the second predefined key data structure, the computer system generates, using a second API corresponding to the given second key, a second output message that includes the given second key and a given second value of the given second key in the second message. Next, the computer system provides the second output message.

Additionally, the second user interface may include: a web-based user interface, RESTConf, a SNMP interface, and/or another type of user interface.

In some embodiments, the ability to transpose and exchange user-interface messages may allow the computer system to be agnostic to a type of the user interface that is used.

Note that the formats of the first output messages or the second output messages may correspond to a different program language than the format of the message or the second format of the second message.

Another embodiment provides the computer or the computer system.

Another embodiment provides a computer-readable storage medium for use with the computer system. When executed by the computer system, this computer-readable storage medium causes the computer system to perform at least some of the aforementioned operations.

Another embodiment provides a method, which may be performed by the computer system. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
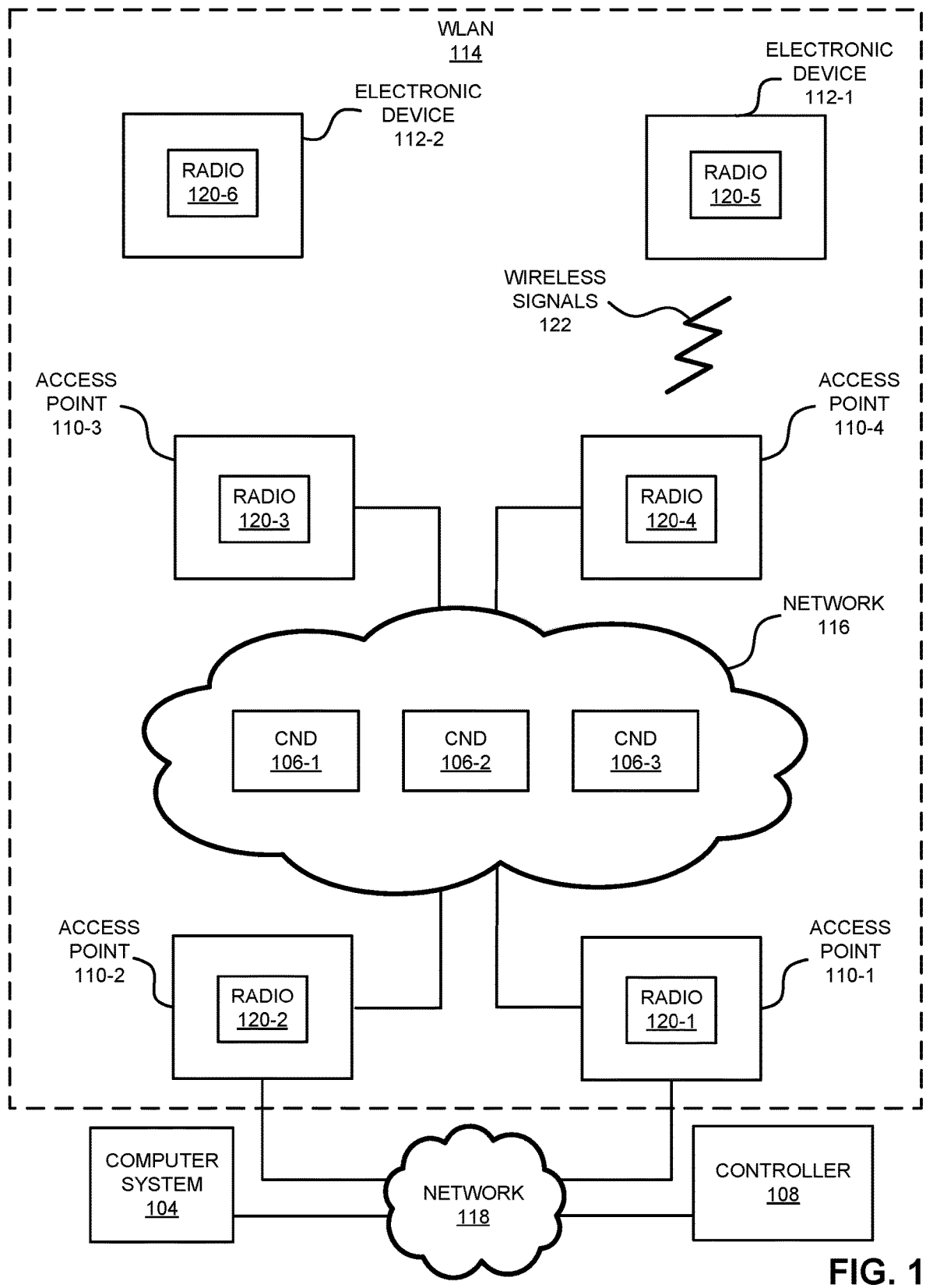
FIG. 1 is a block diagram illustrating an example of communication among electronic devices and computer network devices in a network in accordance with an embodiment of the present disclosure.

In a first group of embodiments, a computer network device (such as an access point, a switch or a router) that has multiple user interfaces is described. During operation, the computer network device may execute program instructions for the user interfaces and a shared messaging module, where a given user interface includes an agent corresponding to an application. When a message associated with the application is received via a user interface in the user interfaces, the corresponding agent in the user interface may extract a command or operation from the message. Then, the shared messaging module may translate the command or operation into a common format of the application. Moreover, the shared messaging module may provide (or route) the translated command or operation addressed to the application via a single communication path associated with the application and the agents for the application in the user interfaces.

By translating the command or operation into the common format and then routing the translated command or operation to the application via the single communication path, these user-interface techniques provide flexibility and consistency. For example, different instances of the command or the operation in messages received via different user interfaces may be indistinguishable from each other after translation into the common format by the shared messaging module. Moreover, the application may be unaware which user interface provided the command or the operation. Furthermore, the common format may not be based on a data model associated with one of the user interfaces. Therefore, the user-interface techniques may not be hierarchical, and may be flexibly extended to include an additional user interface in reduced time and with less expense than existing user-interface techniques. Consequently, the user-interface techniques may improve the user experience when using the computer network device and/or the network that includes the computer network device.

In a second group of embodiments, a computer system that transposes and exchanges user-interface messages is described. During operation, the computer system may extract one or more first keys from one or more key-value pairs in a message (such as a command) associated with a user interface based at least in part on the one or more first keys. Then, the computer system may perform a search of a predefined key data structure based at least in part on a search expression corresponding to the one or more first keys, where the predefined key data structure includes a set of first keys associated with the user interface and a corresponding set of predetermined APIs that encode first key-value pairs in messages as output messages, and where the output messages have different formats from the messages. When a match for a given first key in the one or more first keys is found in the predefined key data structure, the computer system may generate, using an API corresponding to the given first key, an output message that includes the given first key and a given first value in a given key-value pair of the given first key in the message. Next, the computer system may provide the output message.

By translating the message and providing the output message, these communication techniques provide flexibility. For example, the communication techniques may allow the addition of a new supported command associated with the user interface with significantly reduced development time and cost. Similarly, the communication techniques may allow the computer system to support another user interface with significantly reduced development time and cost. In addition, communication techniques may enhance reliability. Notably, by using a search expression corresponding to the one or more first keys in the message, the communication techniques may be independent of the message or the search expression. Consequently, the communication techniques may improve the user experience when using the computer system and/or the network that includes computer network devices that are configured and monitored by the computer network device.

In the discussion that follows, an access point and/or an electronic device (such as a recipient electronic device, which is sometimes referred to as a 'client') may communicate packets or frames in accordance with a wireless communication protocol, such as an Institute of Electrical and Electronics Engineers (IEEE) 802.11 standard (which is sometimes referred to as 'Wi-Fi,' from the Wi-Fi Alliance of Austin, Texas), Bluetooth (from the Bluetooth Special Interest Group of Kirkland, Washington), and/or another type of wireless interface. In the discussion that follows, Wi-Fi is used as an illustrative example. For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies.

However, a wide variety of communication protocols (such as Long Term Evolution or LTE, another cellular-telephone communication protocol, etc.) may be used. The wireless communication may occur in one or more bands of frequencies, such as: a 900 MHz, a 2.4 GHz, a 5 GHz, 6 GHz, the Citizens Broadband Radio Spectrum or CBRS (e.g., a frequency band near 3.5 GHz), a band of frequencies used by LTE or another cellular-telephone communication protocol or a data communication protocol, and/or a 60 GHz frequency band. (Note that IEEE 802.11ad communication over a 60 GHz frequency band is sometimes referred to as 'WiGig.' In the present discussion, these embodiments also encompassed by 'Wi-Fi.') In some embodiments, communication between electronic devices may use multi-user transmission (such as orthogonal frequency division multiple access or OFDMA).

Moreover, the electronic device and/or the access point may communicate with one or more other access points, computer network devices, computers and/or computer systems in a network using a wireless or a wired communication protocol, such as an IEEE 802.11 standard, an IEEE 802.3 standard (which is sometimes referred to as 'Ethernet') and/or another type of wired or wireless interface. In the discussion that follows, Ethernet is used as an illustrative example of communication between the electronic device and/or the access point and the one or more other access points, computer network devices, computers and/or computer systems in the network.

FIG. 1 presents a block diagram illustrating an example of communication among one or more access points 110 and electronic devices 112 (such as a cellular telephone, and which are sometimes referred to as 'clients') in a WLAN 114 (which is used as an example of a network) in accordance with some embodiments. Access points 110 may communicate with each other in WLAN 114 using wireless and/or wired communication (such as by using Ethernet or a communication protocol that is compatible with Ethernet). Note that access points 110 may include a physical access point and/or a virtual access point that is implemented in software in an environment of an electronic device or a computer. In addition, at least some of access points 110 (such as access points 110-3 and 110-4) may communicate with electronic devices 112 using wireless communication.

The wired and/or wireless communication among access points 110 in WLAN 114 may occur via network 116 (such as an intra-net, a mesh network, point-to-point connections and/or the Internet) and may use a network communication protocol, such as Ethernet. For example, WLAN 114 may include computer network devices (CND) 106 (e.g., a switch or a router). In some embodiments, the one or more computer network device 106 may include a stack of multiple computer network devices (which are sometimes referred to as 'stacking units').

Furthermore, the wireless communication using Wi-Fi may involve: transmitting advertising frames on wireless channels, detecting one another by scanning wireless channels, establishing connections (for example, by transmitting association or attach requests), and/or transmitting and receiving packets or frames (which may include the association requests and/or additional information as payloads). In some embodiments, the wired and/or wireless communication among access points 110 also involves the use of dedicated connections, such as via a peer-to-peer (P2P) communication technique. Therefore, access points 110 may support wired communication outside of WLAN 114 (such as Ethernet) and wireless communication within WLAN 114 (such as Wi-Fi), and one or more of access points 110 may also support a wired communication protocol for communicating via network 118 with electronic devices (such as computer system 104 or a controller 108 of WLAN 114, which may be remoted located from WLAN 114).

Figure 9:
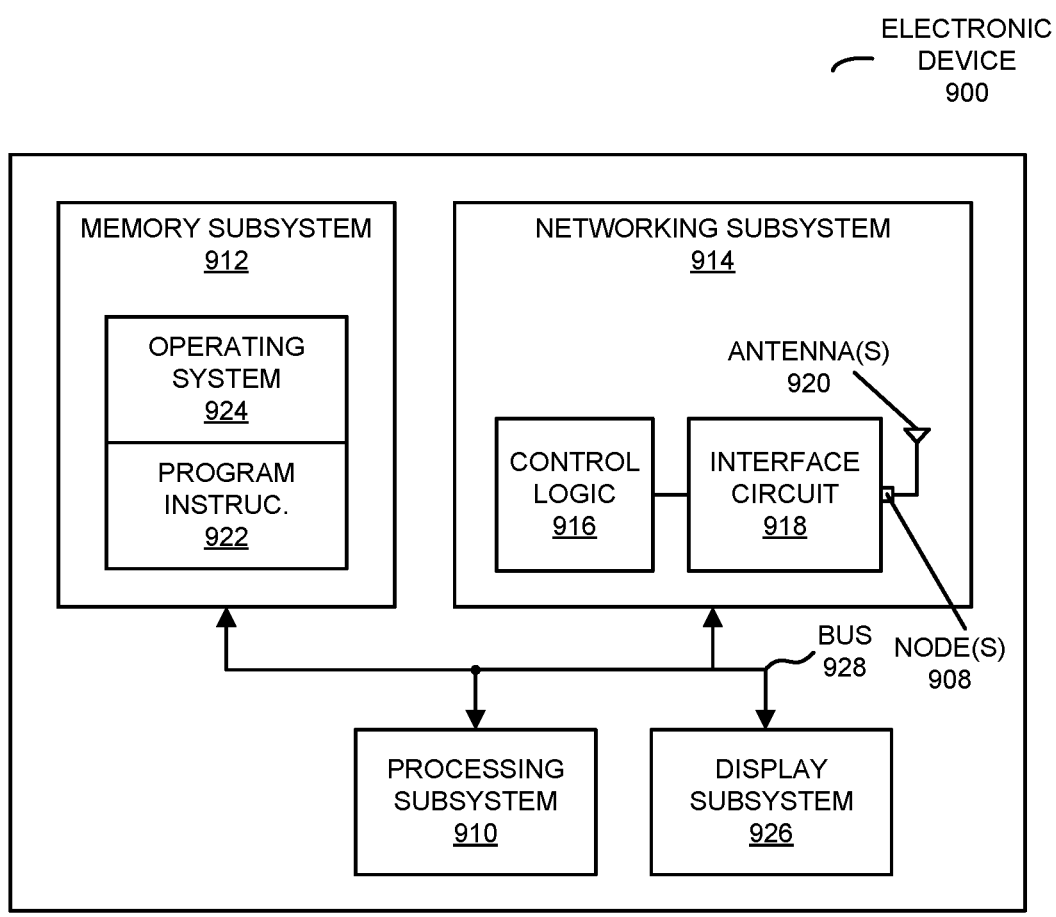
FIG. 9 is a block diagram illustrating an example of an electronic device in accordance with an embodiment of the present disclosure.

As described further below with reference to FIG. 9, the one or more computer network device 106, access points 110, electronic devices 112, controller 108 and/or computer system 104 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120.

As can be seen in FIG. 1, wireless signals 122 (represented by a jagged line) are transmitted from radio 120-4 in access point 110-4. These wireless signals may be received by radio 120-5 in electronic device 112-1. Notably, access point 110-4 may transmit packets or frames. In turn, these packets or frames may be received by electronic device 112-1. Moreover, access point 110-4 may allow electronic device 112-1 to communicate with other electronic devices, computer system 104, computer network devices 106, controller 108, computers and/or servers via networks 116 and/or 118.

Note that the communication among access points 110 and/or with electronic devices 112 (and, more generally, communication among components in WLAN 114) may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in computer network devices 108, access points 110 and/or electronic devices 112 includes: receiving signals (such as wireless signals 122) corresponding to the packet or frame; decoding/extracting the packet or frame from received wireless signals 122 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, many computer network devices that have multiple user interfaces to facilitate concurrent and/or independent management by multiple management entities, select a single user interface as the base user interface with an associated data model, and then translate commands from the remaining user interfaces into commands associated with the base user interface before they can be executed. For example, a typical solution may use a YANG-based RESTconf as the base user interface. When a user uses any other supported user interface (such as a command line interface), the command-line-interface commands may be translated in to RESTConf-based user interface or API calls before being processed by the computer network device or a backend computer system.

However, this approach is typically hierarchical and inflexible. Notably, if a feature may be implemented by configuring parameters a, b and c, it may be operationally easier for users to configure parameters a and c at one time, and then to configure parameter b at a later time when more is known about what the value of parameter b should be. Nonetheless, when a YANG model for this feature is used by RESTConf API, the parameter hierarchy may be ordered so that parameter c cannot be configured before parameter b. Consequently, choosing RESTConf as the base configuration layer or user interface may eliminate the ability for a user to configure the parameters in an operationally convenient manner.

Alternatively, if the command line interface is used as the base configuration or user interface, a translation layer may be needed in order to translate a hierarchically organized YANG model into the command-line-interface syntax, which is usually not hierarchical, consistent or well organized. However, this additional translation layer may be cumbersome, time-consuming and expensive to develop.

A more user-friendly option for managing a computer network device may be to allow multiple ways to configure and/or monitor the computer network device that can be used by users depending on their needs and their level of expertise. In the discussion that follows, the user-interface techniques provide a single monitoring view and a single configuration path for all of the electronic devices that manage a computer network device, while keeping the management user-friendly and flexible.

Figure 2:
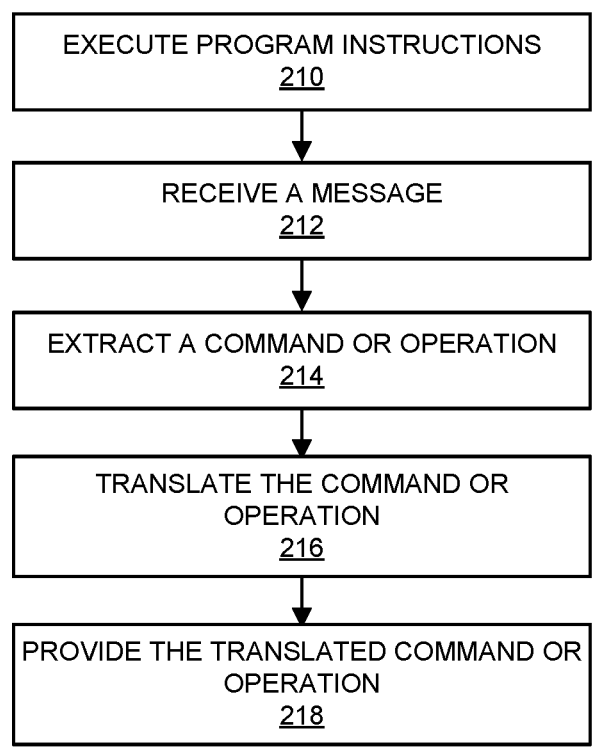
FIG. 2 is a flow diagram illustrating an example of a method for providing a command or operation using a computer network device in FIG. 1 in accordance with an embodiment of the present disclosure.

Notably, as described further below with reference to FIGS. 2-4, in order to address these problems, one or more of access points 110 and computer network devices 106 (such as computer network device 106-1) may implement or provide multiple user interfaces (such as a command line interface, a web-based user interface, RESTConf, or a SNMP interface) and a shared messaging module (which is sometimes referred to as 'a common configuration library and messaging (CLAM)' module). The multiple user interfaces may allow different management entities to concurrently or at different times manage (e.g., configure and/or monitor) one or more of access points 110 and computer network devices 106.

Moreover, the user interfaces may include one or more agents that may have a one-to-one correspondence with one or more applications executed, at least in part, by computer system 104. Thus, a given agent in a given user interface may correspond to a given application, and each of the user interfaces may include an instance of the given agent. For example, when a message associated with the application is received via a user interface in the user interfaces in computer network device 106-1, the corresponding agent in the user interface may extract a command or operation from the message. Then, the CLAM module may translate the command or operation into a common format of the application. Moreover, the shared messaging module may provide the translated command or operation addressed to the application (e.g., on computer system 104) via a single communication path associated with the application and the agents for the application in the user interfaces.

In this way, instances of the command or the operation in messages received via different user interfaces in computer network device 106-1 may be indistinguishable from each other after translation into the common format by the CLAM module. Consequently, the application on computer system 104 may be unaware which of the user interfaces provided the command or the operation. Moreover, the common format may not be based on a data model associated with one of the user interfaces.

Consequently, the user-interface techniques may provide a flexible and consistent approach for configuring and/or monitoring one or more of access points 110 and computer network devices 106. Moreover, the user-interface techniques may not be hierarchical, and may be flexibly extended to include an additional user interface in reduced time and with less expense than existing user-interface techniques. Therefore, the user-interface techniques may improve the user experience when using one or more of access points 110 and computer network devices 106 and/or the network that includes one or more of access points 110 and computer network devices 106.

Alternatively or additionally, as noted previously, many computer network devices have multiple user interfaces to facilitate concurrent and/or independent management by multiple management entities. However, it is often challenging to support multiple user interfaces. For example, if a single user interface is selected as the base user interface, it can be cumbersome to translate commands from the remaining user interfaces may be translated into commands associated with the base user interface before they can be executed. Moreover, this approach is hierarchical and inflexible, which can make it time-consuming and expensive to modify a command or add a new command, or to support another user interface.

These problems may be addressed using the communication techniques. Notably, as described further below with reference to FIGS. 5-8, in order to address these problems, one or more of access points 110 and computer network devices 106 (such as computer network device 106-1) may implement or provide multiple user interfaces (such as a command line interface, a web-based user interface, RESTConf, a SNMP interface, or another type of user interface). Moreover, the one or more of access points 110 and computer network devices 106 and/or computer system 104 may implement a messaging module that allows messages (such as commands) received using one or more of the user interfaces to be translated into output messages and exchanged. (Thus, the communication techniques may be implemented, at least in part, in a centralized or a distributed manner.) For example, the output messages may be provided to a shared messaging module (which is sometimes referred to as 'a common configuration library and messaging (CLAM)' module), which may provide the output messages to a back-end in computer system 104. Applications, executed at least in part in the back-end in computer system 104, may configure and/or monitor one or more of access points 110 and computer network devices 106 based at least in part on the output messages.

In some embodiments, the output messages associated with different applications may have a common format. However, in other embodiments, a given output message may have a common format associated with a given application (and, thus, different applications may have different formats). Moreover, the given output message may be provided to the given application via a single communication path associated with the given application.

In the discussion that follows, computer network device 106-1 is used to illustrate at least a portion of the communication techniques. However, in other embodiments, the communication techniques may be performed by computer system 104.

Notably, computer network device 106-1 may receive, via a user interface (such as a CLI), a message (such as a command), e.g., from a computer (not shown), where the message has a format associated with the user interface and includes one or more key-value pairs. For example, an instance of a key-value pair may be associated with a given command. Then, computer network device 106-1 (such as a messaging module or a software agent associated with the user interface) may extract one or more first keys from the one or more key-value pairs in the message.

Moreover, computer network device 106-1 may perform a search of a predefined key data structure based at least in part on a search expression corresponding to the one or more first keys, where the predefined key data structure includes a set of first keys associated with the user interface and a corresponding set of predetermined APIs that encode first key-value pairs in messages as output messages, and where the output messages have different formats from the messages. For example, the search expression may include a protocol buffer that includes the one or more first keys. This protocol buffer may be associated with the user interface or the message. Moreover, the protocol buffer may include one or more classes of c (or program) files with attributes and associated variables (such as keys). Note that a 'protocol buffer' may include a technique for serializing structure data, and may involve an interface description language that describes the structure of some data and a program that generates source code from that description for generating or parsing a stream of bytes that represents the structured data. In some embodiments, a 'protocol buffer' includes an open-source message format.

When a match for a given first key in the one or more first keys is found in the predefined key data structure, computer network device 106-1 may generate, using an API corresponding to the given first key, an output message that includes the given first key and a given first value in a given key-value pair of the given first key in the message. In some embodiments, the output message may include a protocol buffer. Note that if there is no match in the predefined key data structure, the search result for inclusion in the output message may be Boolean, such as a '0' or a '1'.

Next, computer network device 106-1 may provide the output message, e.g., to computer system 104. For example, the output message may be provided to a given application executed by computer system 104.

In some embodiments of the communication techniques, the aforementioned operations may be repeated when a second message associated with a second user interface is received from the computer or another computer (note shown). This instance of the communication techniques may use a second predefined key data structure that includes a set of second keys associated with the second user interface and a corresponding set of second predetermined APIs that encode second key-value pairs in second messages as second output messages, where the second output messages have different formats from the second messages. Note that the second user interface may include: a web-based user interface, RESTConf, a SNMP interface and/or another type of user interface.

In this way, instances of a command or an operation in messages received via different user interfaces in computer network device 106-1 may be indistinguishable from each other after translation into the output messages having the common format of at least one of the applications. Consequently, the application on computer system 104 may be unaware which of the user interfaces provided the command or the operation.

Consequently, the communication techniques may provide a flexible and consistent approach for configuring and/or monitoring one or more of access points 110 and computer network devices 106. Moreover, the communication techniques may not be hierarchical, and may be flexibly modified or extended to include different commands, new commands and/or an additional user interface in reduced time and with less expense than existing communication techniques. Therefore, the communication techniques may improve the user experience when using one or more of access points 110 and computer network devices 106 and/or the network that includes one or more of access points 110 and computer network devices 106.

We now describe embodiments of a method in the user-interface techniques. FIG. 2 presents a flow diagram illustrating an example of a method 200 for providing a command or an operation in accordance with some embodiments. This method may be performed by a computer network device (such as one of access points 110 or computer network devices 106 in FIG. 1).

During operation, the computer network device (such as an access point, a router or a switch) may execute program instructions (operation 210) for user interfaces and a shared messaging module, where a given user interface includes an agent corresponding to an application. When a message associated with the application is received (operation 212) via a user interface in the user interfaces, the corresponding agent in the user interface may extract a command or operation (operation 214) from the message. Then, the shared messaging module may translate the command or operation (operation 216) into a common format of the application. Moreover, the shared messaging module may provide (or route) the translated command or operation (operation 218) addressed to the application via a single communication path associated with the application and the agents for the application in the user interfaces.

Note that the external communication with the user interfaces may include non-inter-process communication, and the communication between the shared messaging module and at least the application may include inter-process communication.

Moreover, the application may be associated with configuration and/or monitoring of the computer network device. Note that the application may be executed by a computer or a computer system (which is separate from or different from the computer network device). However, in some embodiments, the application may, at least in part, be executed by the computer network device.

Furthermore, when there are multiple applications, the given user interface may include multiple agents corresponding to the applications.

In some embodiments, instances of the command or the operation in messages received via different user interfaces may be indistinguishable from each other after translation into the common format by the shared messaging module. Consequently, the application may be unaware which of the user interfaces provided the command or the operation.

Additionally, the common format may not be based on a data model associated with one of the user interfaces. For example, the common format may not be YANG-based.

Furthermore, the user interfaces may include one or more of: a command line interface, a web-based user interface, RESTConf, or a SNMP interface.

In some embodiments of method 200, there may be additional or fewer operations. Furthermore, the order of the operations may be changed, and/or two or more operations may be combined into a single operation.

Figure 3:
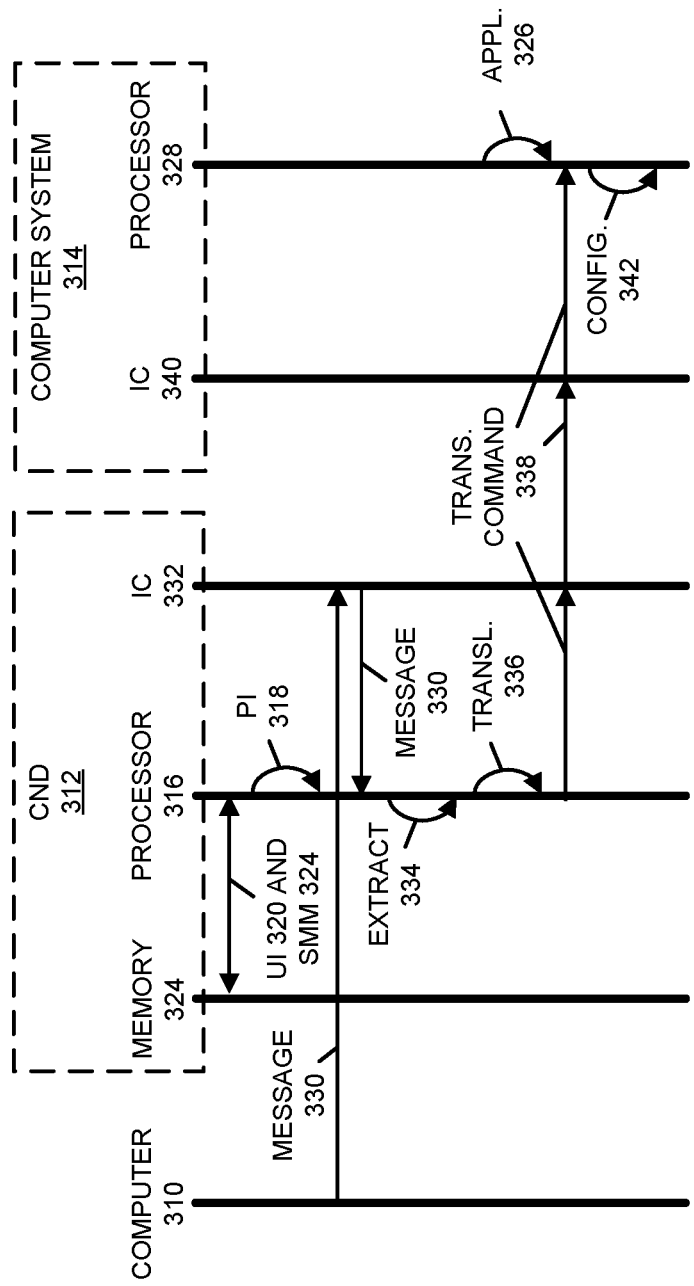
FIG. 3 is a drawing illustrating an example of communication among components in an electronic device in FIG. 1 in accordance with an embodiment of the present disclosure.

FIG. 3 presents a drawing illustrating an example of communication among a computer 310, computer network device 312 and computer system 314 in a network in accordance with some embodiments. Notably, a processor 316 in computer network device 312 may execute program instructions (PI) 318 for user interfaces (UI) 320 and a shared messaging module (SMM) 322 (which are stored in memory 324 in computer network device 312), where a given user interface includes an agent corresponding to an application 326 executed by a processor 328 in computer system 314.

In order to configure operation and/or monitoring of computer network device 312 by application 326, computer 310 may provide a message 330 to computer network device 312. Interface circuit 332 in computer network device 312 may provide message 330 to processor 316, which may receive message 330 via a user interface in user interfaces 320. Then, the agent in the user interface may extract 334 a command or operation from message 330. Moreover, the shared messaging module 320 may translate 336 the command or operation into a common format of application 326. Next, the shared messaging module 322 may provide (or route) the translated command 338 or operation addressed to application 326 via a single communication path associated with application 326 and agents for application 326 in user interfaces 320. For example, translated command 338 may be provided by interface circuit 332 in one or more packets or frames.

Moreover, after receiving translated command 338, interface circuit 340 in computer system 314 may provide translated command 338 to processor 328. Then, processor may configure 342 application 326 based at least in part on translated command 338.

While FIG. 3 illustrates communication between components using unidirectional or bidirectional communication with lines having single arrows or double arrows, in general the communication in a given operation in these figures may involve unidirectional or bidirectional communication.

Figure 4:
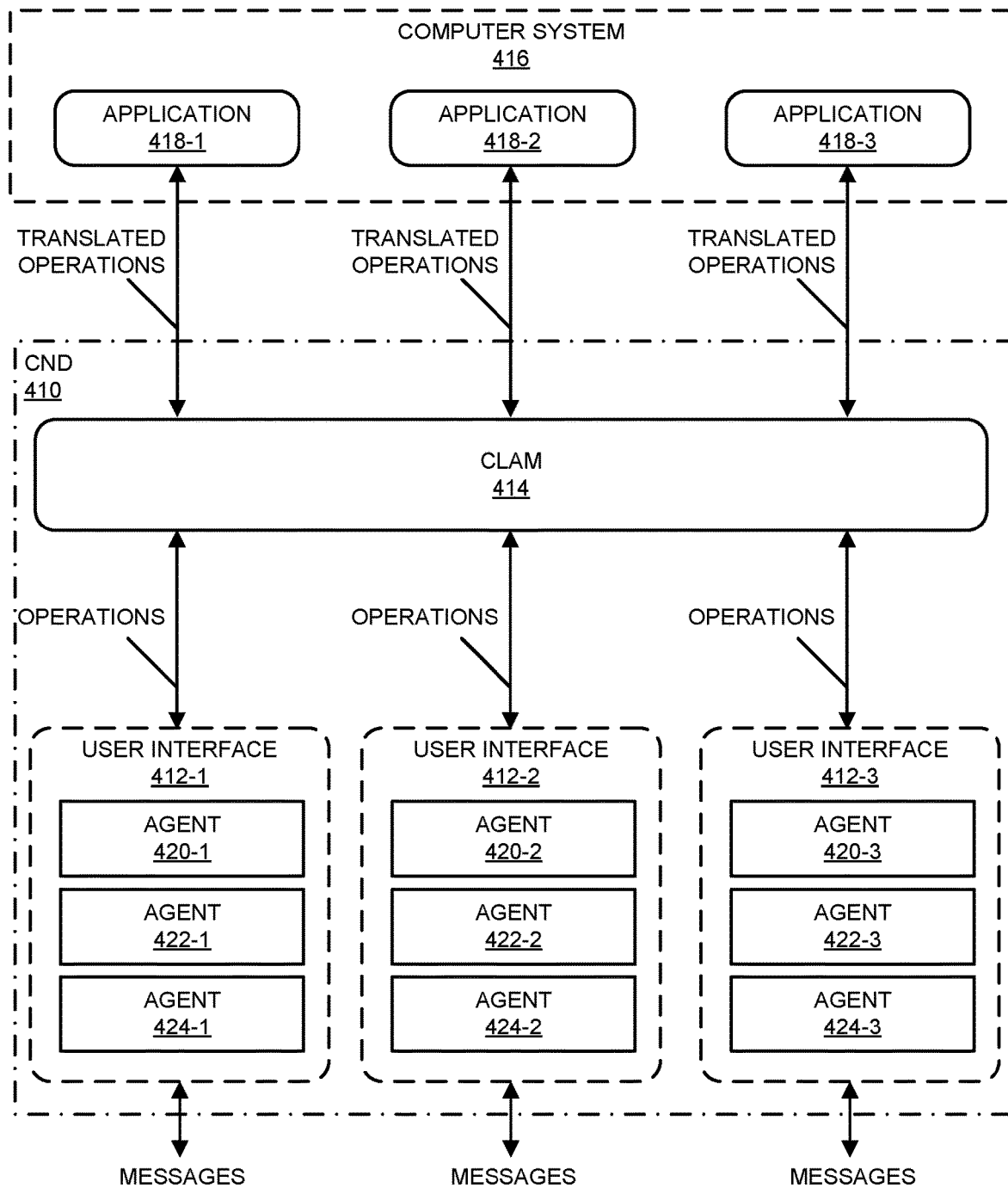
FIG. 4 is a drawing illustrating an example of a system architecture including a common configuration library and messaging (CLAM) module in a network in accordance with an embodiment of the present disclosure.

FIG. 4 presents a drawing illustrating an example of a system architecture including a CLAM module in a network in accordance with some embodiments. Notably, FIG. 4 illustrates a unified programmable infrastructure for multi-interface management in the user-interface techniques that allows each of individual user interfaces 412 (e.g., SNMP, a command line interface, a web-based user interface, REST-Conf, Hypertext Transfer Protocol or HTTP, SSH file transfer protocol or SFTP, etc.) to retain their unique advantages in configuration and/or monitoring of computer network device 410, while ensuring that a consistent and singular system view is provided to each of user interfaces 412.

As shown in FIG. 4, user interfaces 412 and CLAM module 414 may be executed by computer network device 410. Moreover, CLAM module 414 may interface with applications 418 that executed by computer system 416, which may provide backend configuration and monitoring for computer network device 410. Note that computer system 416 may be implemented at the same location as computer network device 410 (i.e., locally) or remotely (such as a cloud-based computer system).

Moreover, as shown in FIG. 4, computer network device 410 (and the system as a whole) may support, e.g., three user interfaces 410. Each of user interfaces 410 may be used independently to configure applications 418.

In the user-interface techniques, each of applications 418 may have its own instance of an agent (such as one of agents 420, 422 and 424) running for each of supported user interface 412. (While separate instances of agents 420, 422 and 424 are shown in FIG. 4, in other embodiments, two or more instances of agents 420, 422 and 424 may be combined in at least one of user interfaces 412.) Note that agents 420, 422 and 424 may be used because each of user interfaces 412 may provide configuration data in a unique format. For example, a command line interface may provide inputs to computer network device 410 as strings, while an SNMP input may be processed from packets into a variable binding or varbind data structure, etc. Agents 420, 422 and 424 may extract these different inputs, which are passed to CLAM module 414 and then converted or translated into a common format of one of applications. In some embodiments, a give instance of one of agents 420, 422 and 424 may be an API that extracts a command or operations from a given message received on a given user interface, which is then provided to CLAM module 414.

CLAM module 414 may ensure that even though a given one of applications 418 may have multiple agents (such as agents 420) associated with each of user interfaces 412, a single configuration or monitoring operation may execute in a given one of applications 418 in an identical manner based on inputs received on any of user interfaces 412. Notably, CLAM module 414 may implement a service library access manager that provides a packet gateway that takes messages associated with a given one of applications 418 to an underlying operating system service call that uses different protocols to translate commands or operations in the messages into a common format of a given one of applications 418. For example, CLAM module 414 may look up predefined configuration information for a given one of applications 418 corresponding to the extract command or operation (as well as any associated parameters or information) from a given message. Moreover, CLAM module 414 may determine the location of the given one of applications 418 and may provide (or route) the translated command or operation (as well as associated configuration information via a single or common interface or communication path for multiple agents (such as agents 420) to the given one of applications 418 (such as application 418-1).

Thus, CLAM module 414 may orchestrate the operations such that applications 418 in computer system 416 may be unaware which of user interfaces 412 is triggering a give configuration command or operation. Furthermore, a given one of applications 418 (such as application 418-1) may receive the same message for a command or an operation (e.g., a translated command or operation in a common format) regardless of which one of user interfaces 412 on which it was originally received.

Figure 5:
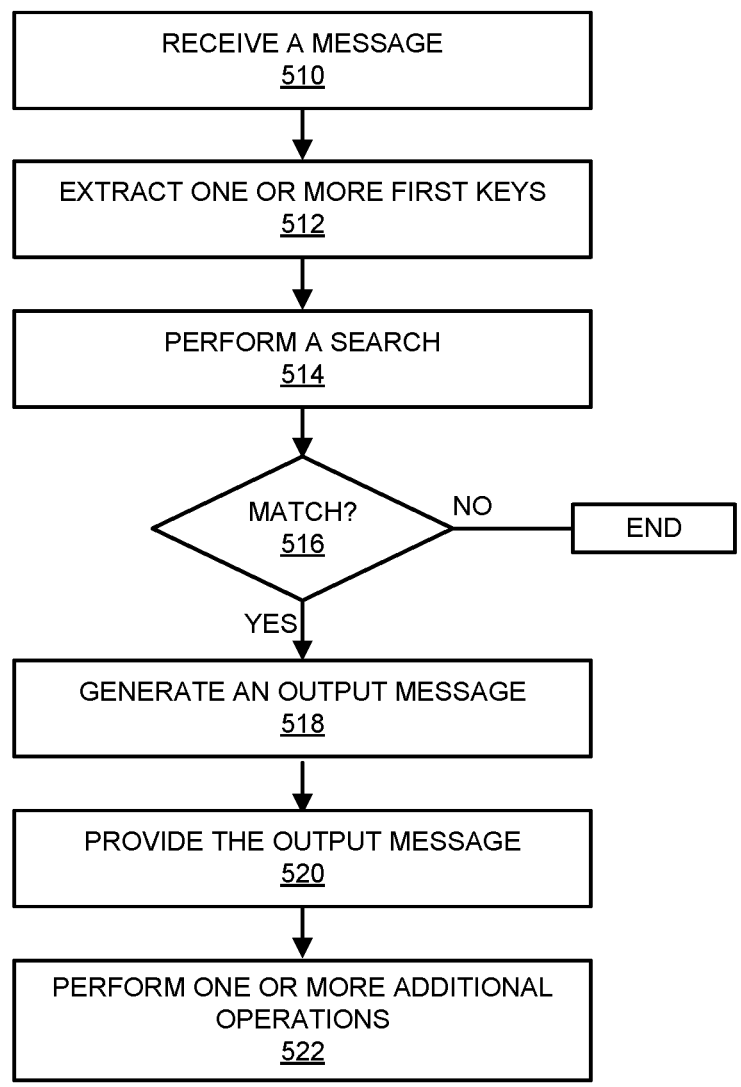
FIG. 5 is a flow diagram illustrating an example of a method for providing an output message using a computer system in FIG. 1 in accordance with an embodiment of the present disclosure.

We now describe embodiments of a method in the communication techniques. FIG. 5 presents a flow diagram illustrating an example of a method 500 for providing an output message in accordance with some embodiments. This method may be performed by a computer system (such as computer system 104, one of access points 110 or computer network devices 106 in FIG. 1).

During operation, the computer system may receive, via a user interface, a message (operation 510) associated with a computer, where the message has a format associated with the user interface, where the message includes one or more key-value pairs. For example, the user interface may include a CLI.

Then, the computer system may extract one or more first keys (operation 512) from the one or more key-value pairs in the message.

Moreover, the computer system may perform a search (operation 514) of a predefined key data structure based at least in part on a search expression corresponding to the one or more first keys, where the predefined key data structure includes a set of first keys associated with the user interface and a corresponding set of predetermined APIs that encode first key-value pairs in messages as output messages, and where the output messages have different formats from the messages. For example, the search expression may include a protocol buffer that includes the one or more first keys. Note that the protocol buffer may be associated with the user interface or the message.

When a match for a given first key in the one or more first keys is found (operation 516) in the predefined key data structure, the computer system may generate, using an API corresponding to the given first key (such as an identified API in the predefined key data structure), the output message (operation 518) that includes the given first key and a given first value in a given key-value pair of the given first key in the message. (Otherwise, method 500 may end.) For example, the computer system generates the output message by associating the protocol buffer with a new or a pre-existing output message. In some embodiments, the output message may be a type of message corresponding to a type of the protocol buffer.

Next, the computer system may provide the output message (operation 520). For example, the output message may be provided to an application, executed by the computer system, which configures or monitors a computer network device, such as a router or a switch in a network.

Note that the computer system may include one or more electronic devices. In some embodiments, the computer system includes the computer network device, such as a switch or a router in a network.

In some embodiments, the computer system may optionally perform one or more additional operations (operation 522). For example, the computer system may receive, via a second user interface, a second message having a second format associated with the second user interface, where the second message includes one or more second key-value pairs. Then, the computer may extract one or more second keys from the one or more second key-value pairs in the second message based at least in part on the one or more second keys. Furthermore, the computer system performs a second search of a second predefined key data structure based at least in part on a second search expression corresponding to the one or more second keys, where the second predefined key data structure includes a set of second keys associated with the second user interface and a corresponding set of second predetermined APIs that encode second key-value pairs in second messages as second output messages, and where the second output messages have different formats from the second messages. When a match for a given second key in the one or more second keys is found in the second predefined key data structure, the computer system generates, using a second API corresponding to the given second key (such as an identified second API in the second predefined key data structure), a second output message that includes the given second key and a given second value in a given second key-value pair of the given second key in the second message. Next, the computer system provides the second output message.

Note that the second user interface may include: a web-based user interface, RESTConf, a SNMP interface, and/or another type of user interface.

In some embodiments, the ability to transpose and exchange user-interface messages may allow the computer system to be agnostic to a type of the user interface that is used. Notably, the output message may be agnostic to a type of the user interface.

Moreover, the formats of the first output messages or the second output messages may correspond to a different program language than the format of the message or the second format of the second message.

In some embodiments of method 500, there may be additional or fewer operations. Furthermore, the order of the operations may be changed, and/or two or more operations may be combined into a single operation.

Figure 6:
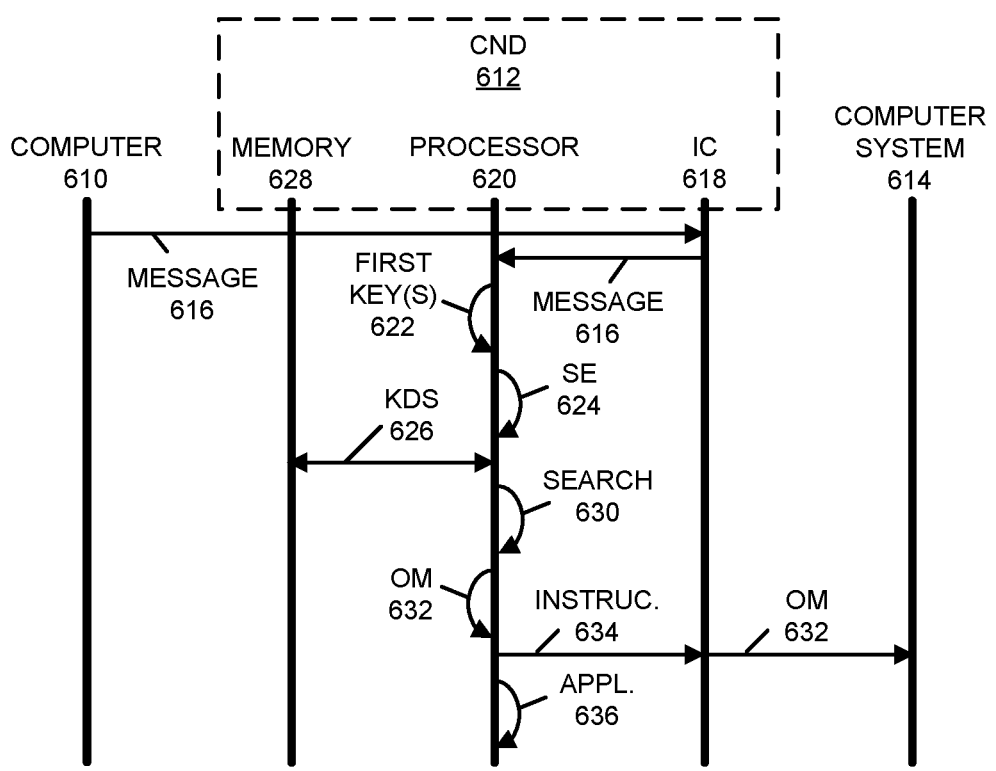
FIG. 6 is a drawing illustrating an example of communication among components in a computer system in FIG. 1 in accordance with an embodiment of the present disclosure.

FIG. 6 presents a drawing illustrating an example of communication among a computer 610, computer network device 612 and computer system 614 in a network in accordance with some embodiments. Notably, computer 610 may provide a message 616 via a user interface (such as a CLI).

After receiving message 616, an interface circuit 618 in computer network device 612 may provide message 616 to processor 620 in computer network device 612. Processor 620 may extract one or more first keys 622 from one or more key-value pairs in message 616 based at least in part on the one or more first keys 622. Then, processor 620 may generate a search expression (SE) 624 based at least in part on the one or more first keys 622. For example, the search expression 624 may include a protocol buffer that includes the one or more first keys 622.

Moreover, processor 620 may access a predefined key data structure (KDS) 626 stored in memory 628 in computer network device 612. This predefined key data structure may include a set of first keys associated with the user interface and a corresponding set of predetermined APIs that encode first key-value pairs in messages as output messages, where the output messages have different formats from the messages.

Next, processor 620 may perform a search 630 of the predefined key data structure 620 based at least in part on search expression 624 corresponding to the one or more first keys 622. When processor 620 finds a match for a given first key in the one or more first keys 622 in the predefined key data structure 628, processor 620 may generate, using an API corresponding to the given first key (such as an identified API in predefined key data structure 628), an output message (OM) 632 that includes the given first key and a given first value in a given key-value pair of the given first key in message 616.

Next, processor 620 may provide output message 632. For example, processor 620 may instruct 634 interface circuit 618 to provide output message 632 to an application executed by computer system 614. Alternatively, processor 620 may provide output message 632 to application 636 executed by processor 620. Note that application 634 may configure or monitor a computer network device, such as computer network device 612.

While FIG. 6 illustrates communication between components using unidirectional or bidirectional communication with lines having single arrows or double arrows, in general the communication in a given operation in these figures may involve unidirectional or bidirectional communication.

In some embodiments, the communication techniques may allow messages to be translated and exchanged, e.g., using protocol buffers between a front-end CLU and back-end network applications in a computer system.

Traditionally, CLIs are the most used interface for configuration of computer network devices. Consequently, there are a rich set of CLI commands for various configurations. Moreover, during CLI development, commands are often parsed and translated into appropriate data types in order to interact with back-end applications. However, this approach typically requires statically defining the parser nodes and data structures, which often increases the development time and, thus, usually results in development lifecycles.

The disclosed communication techniques parse front-end commands and transport them to back-end applications. This capability may also be used by new user-interface components, e.g., by leveraging pre-existing protocol buffers and transposer techniques.

In the present discussion, a front-end process space may be used to parse one or more commands and construct one or more messages to be transported to applications. Moreover, the back-end process space is used by various network applications and receives front-end configuration messages. Furthermore, CLAM is a transport library that may be used to transport protocol buffer-based messages from the front-end to the back-end. This library may provide message-to-application transport based at least in part on identification of available mapping by resource files (such as a predefined key data structure associated with the CLI or another user interface).

Figure 7:
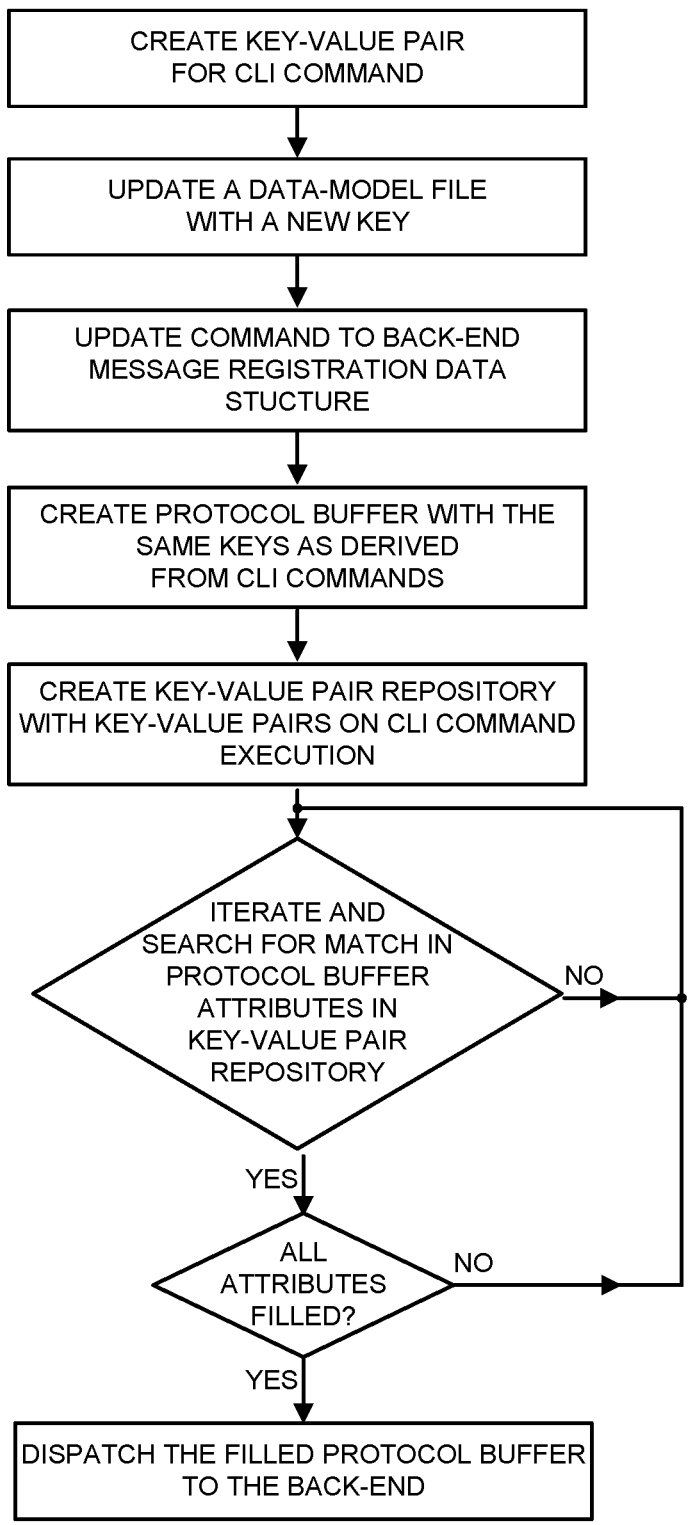
FIG. 7 is a drawing illustrating an example of a method for providing an output message using a computer system in FIG. 1 in accordance with an embodiment of the present disclosure.

FIG. 7 presents a drawing illustrating an example of a method 700 for providing an output message. During the method 700, a computer system (e.g., based at least in part on instructions received from a user or a software agent associated with the user interface) may define a new or an existing command in key-value pair format. In addition, a data model tool (such as YANG) or a proprietary technique may be defined for use in identifying a keys tree. For example, a command may include: ip tcp burst-normal <value> burst-max <value> lockup <value>. This command includes multiple keys: tcp, burst-normal, burst-max, and lockup.

Then, the computer system (e.g., based at least in part on instructions received from a user or a software agent associated with the user interface) may define a protocol buffer message with the same keys as defined in the CLI command. Table 1 provides an example of a protocol buffer message. Note that the protocol buffer attributes name may be the same as the key.

TABLE 1

```
ddos.proto
message ddos
{
bool        tcp           =  1;
uint32      burst_normal  =  2;
unit32      burst_max     =  3;
uint32      lockup        =  4;
};
```

Moreover, the computer system (e.g., based at least in part on instructions received from a user or a software agent associated with the user interface) may form or create a key-value pair repository (such as a predefined key data structure) for key-value pairs from user commands that are associated with the user interface (such as CLI) in the front-end. For example, for a CLI command "ip tcp burst-normal 100 burst-max 1000 lockup 5000," a corresponding entry in the key-value pair repository may be "tcp, burst-normal: 100, burst-max: 1000, lockup: 5000."

Furthermore, the computer system may perform a search in the key-value pair repository based at least in part on protocol buffer descriptors (and, more generally, a search expression) and may assign the values to protocol buffer attributes via the descriptors if a key-value-pair repository match is found. Stated differently, the key-value pair repository may include APIs that encode an output message with the keys and the corresponding values from the input CLI command.

Figure 8:
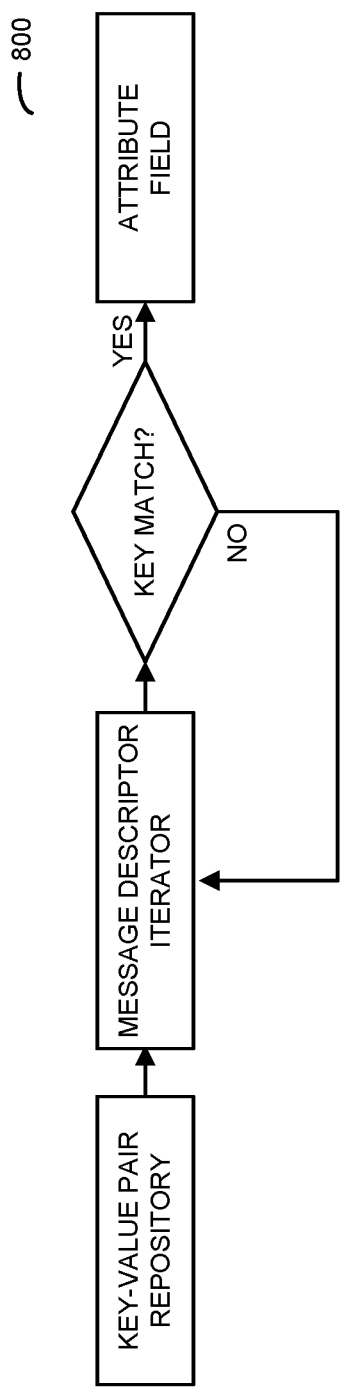
FIG. 8 is a drawing illustrating an example of a method for performing a search using a computer system in FIG. 1 in accordance with an embodiment of the present disclosure.

The protocol buffer may provide message descriptors that iterate over the structure variables based at least in part on their index. Via this iteration, the computer system may fetch the names of the structure variables names. The logical flow is shown in FIG. 8, which presents a drawing illustrating an example of a method 500 for performing a search.

Referring back to FIG. 7, the computer system may associate a new or an existing back-end message (or an output message) with the protocol buffer. This may ensure that the protocol buffer is transported from the front-end to the back-end, e.g., via CLAM. Table 2 presents an example of a message registration table, which may be used to perform the association and, thus, the transport to the back-end.

TABLE 2

| Protocol Buffer Type | Message Type | Back-End Application Call Back |
|---|---|---|
| ddos.proto | FE_BE_MESSAGE_DDOS | ddos_application_callback |
| stp.proto | FE_BE_MESSAGE_STP | stp_application_callback |

Additionally, the computer system may unpack the protocol buffer message received via registered call back. The unpacked buffer may be used directly or via any data model, such as YANG in a back-end network application.

As noted previously, the communication techniques may used to integrated a new user-interface component. Notable, a new user interface (such as RESTConf, a web-based user interface, etc.) may use method 700 if the computer system (e.g., based at least in part on instructions received from a user) builds or defines another key-value pair repository from the configuration request. Because protocol buffer-to-message mapping is already defined for the CLI framework, and CLAM is available as a common library for dispatching the message to the appropriate back-end application or module, the communication techniques may be used to rapidly integrate a new user interface. For example, a user-interface agent may define or build a key-value pair repository for a transposer (or a messaging module) to look-up for matching and assigning the relevant values, which then becomes agnostic to user interface.

The communication techniques may provide quick turn-around command plug-in. Notably, a turn-around time for CLI, RESTConf etc. configuration commands may be significantly reduced because the communication techniques would only need the new commands to be defined in a key-value pair repository, along with a new protocol buffer and a message registration (which may be used to generate the output message). With these three resources in place, an agent or a messaging module associated with the new user interface may be able to parse a new command and create an entry in the key-value pair repository, which may serve as a source for the transposer logic to fill the protocol buffer so that CLAM may transmit the packed protocol buffer from the front-end to the back-end.

Moreover, the communication techniques may provide generic and error-free logic. Notably, by augmenting key-value pairs through a command input and using the same key names in protocol buffers, the logic to fill the protocol buffers may be command and protocol buffer agnostic, which may reduce or eliminate errors. This capability may significantly boost code reliability.

Furthermore, the communication techniques may significantly reduce the amount of software code that needs to be written for configuration-command adaptation.

In some embodiments, the communication techniques may be used to introduce a new front-end user interface for CLI(s), where a first-in first-out key-value pair repository may be built on existing parser logic in the computer system. In these embodiments, a given application may define its protocol buffer attributes to be the same as the parser key names in the key-value pair repository and the transposer may fill the protocol buffer, which is then handed to the transport-library CLAM for transport to the given application. This approach may significantly reduce the amount of software code in the front-end CLI agent and may facilitate a rapid pace development. For example, approximately 30,000 CLI commands in an access-list may be code complete and unit tested in four sprint cycles.

In some embodiments, a user (via an electronic device) may connect to a computer network device, such as a switch, a router or an access point. In the discussion that follows, a switch is used as an illustrative example. Then, the user may configure the switch or an aspect of a network that includes the switch (such as a distributed denial of service or DDoS firewall) via the switch. For example, the user may provide user request or a command, such as: ip tcp burst-normal <value1> burst-max <value2> lockup <value3>. This command may be provided via a front-end user interface, such as a CLI program.

In response, the switch may encode the command into an encoded message (or output message) having an internal message format. Then, the switch may provide, via the network, the encoded message to a firewall program that is implemented in a back-end of the network (such as by a remote computer or a cloud-based controller). The firewall program may receive the encoded message and may decode the encoded message. Next, the firewall program may apply the received request or command as a new firewall. Moreover, the firewall program may provide a success response to the switch, which in turn may provide the success response to the user (or an electronic device used by the user).

In order to support this functionality, the operations performed by the front end on the switch and the firewall program may be implemented using program instructions. Notably, the communication techniques may provide a framework for generating the program instructions for complicated or error-prone portions of the aforementioned operations. For example, the encoded message may be defined as a key-value pair, where the keys reflect the same user input, i.e., the command. In the CLI example where the command is "ip tcp burst-normal <value1> burst-max <value2> lockup <value3>", the encoded message may have tcp, burst-normal, burst-max and lockup as the keys. If this framework is followed, the program instructions needed to encode the command as the encoded message, to send the message to the firewall program, and to decode the encoded message may be automatically generated. This capability may facilitate more rapid functionality development and/or error-free program instructions for complicated computer logic.

Notably, during setup of the framework, a protocol buffer may be defined (e.g., by an engineer) with one or more keys that match one or more keys in a request or a command (such as a CLI command). Based at least in part on this protocol buffer, a key library or repository may be automatically generated with a set of program instructions that provide one or more functions in the CLI command. For example, the set of program instructions may include APIs that use the one or more functions.

For example, for the command "ip tcp burst-normal <value1> burst-max <value2> lockup <value3>", a protocol buffer message entitled "ddos_firewall_definition" may include: tcp burst-normal burst-max lockup. Then, a script may be run on the protocol buffer message to automatically generate several APIs, including: an encode API, a decode API, and a lookup of an internal data structure. These APIs may be stored in a key data structure (which is sometimes referred to as a library or a repository). When the command is subsequently received from a user, the encode API may be access in the key data structure. This encode API may take the input "ip tcp burst-normal <value1> burst-max <value2> lockup <value3>", may search the key-value pairs to populate the internal data structure, and may return an encoded message with the keys and the corresponding values. This encoded message may be provided to the back-end firewall program. Moreover, the back-end firewall program may use the decode API, which takes the encode API as an input and may create the key-value pairs data structure. Furthermore, the lookup of the internal data structure may search for the key-value pair in the internal data structure.

We now describe embodiments of an electronic device, which may perform at least some of the operations in the user-interface techniques and/or the communication techniques. FIG. 9 presents a block diagram illustrating an example of an electronic device 900 in accordance with some embodiments, such as one of computer system 104, one of computer network devices 106, controller 108, one of access points 110 or one of electronic devices 112. This electronic device includes processing subsystem 910, memory subsystem 912, and networking subsystem 914. Processing subsystem 910 includes one or more devices configured to perform computational operations. For example, processing subsystem 910 can include one or more microprocessors, ASICs, microcontrollers, programmable-logic devices, one or more graphics process units (GPUs) and/or one or more digital signal processors (DSPs).

Memory subsystem 912 includes one or more devices for storing data and/or instructions for processing subsystem 910 and networking subsystem 914. For example, memory subsystem 912 can include dynamic random access memory (DRAM), static random access memory (SRAM), and/or other types of memory. In some embodiments, instructions for processing subsystem 910 in memory subsystem 912 include: one or more program modules or sets of instructions (such as program instructions 922 or operating system 924), which may be executed by processing subsystem 910. Note that the one or more computer programs may constitute a computer-program mechanism. Moreover, instructions in the various modules in memory subsystem 912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 910.

In addition, memory subsystem 912 can include mechanisms for controlling access to the memory. In some embodiments, memory subsystem 912 includes a memory hierarchy that comprises one or more caches coupled to a memory in electronic device 900. In some of these embodiments, one or more of the caches is located in processing subsystem 910.

In some embodiments, memory subsystem 912 is coupled to one or more high-capacity mass-storage devices (not shown). For example, memory subsystem 912 can be coupled to a magnetic or optical drive, a solid-state drive, or another type of mass-storage device. In these embodiments, memory subsystem 912 can be used by electronic device 900 as fast-access storage for often-used data, while the mass-storage device is used to store less frequently used data.

Networking subsystem 914 includes one or more devices configured to couple to and communicate on a wired and/or wireless network (i.e., to perform network operations), including: control logic 916, an interface circuit 918 and one or more antennas 920 (or antenna elements). (While FIG. 9 includes one or more antennas 920, in some embodiments electronic device 900 includes one or more nodes, such as nodes 908, e.g., a network node that can be coupled or connected to a network or link, or an antenna node, connector or a metal pad that can be coupled to the one or more antennas 920. Thus, electronic device 900 may or may not include the one or more antennas 920.) For example, networking subsystem 914 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Note that a transmit or receive antenna pattern (or antenna radiation pattern) of electronic device 900 may be adapted or changed using pattern shapers (such as reflectors) in one or more antennas 920 (or antenna elements), which can be independently and selectively electrically coupled to ground to steer the transmit antenna pattern in different directions. Thus, if one or more antennas 920 include N antenna pattern shapers, the one or more antennas may have 2 N different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 900 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting advertising or beacon frames and/or scanning for advertising frames transmitted by other electronic devices as described previously.

Within electronic device 900, processing subsystem 910, memory subsystem 912, and networking subsystem 914 are coupled together using bus 928. Bus 928 may include an electrical, optical, and/or electro-optical connection that the subsystems can use to communicate commands and data among one another. Although only one bus 928 is shown for clarity, different embodiments can include a different number or configuration of electrical, optical, and/or electro-optical connections among the subsystems.

In some embodiments, electronic device 900 includes a display subsystem 926 for displaying information on a display, which may include a display driver and the display, such as a liquid-crystal display, a multi-touch touchscreen, etc.

Electronic device 900 can be (or can be included in) any electronic device with at least one network interface. For example, electronic device 900 can be (or can be included in): a desktop computer, a laptop computer, a subnotebook/ netbook, a server, a tablet computer, a smartphone, a cellular telephone, a smartwatch, a consumer-electronic device, a portable computing device, an access point, a transceiver, a router, a switch, communication equipment, a computer network device, a stack of multiple computer network devices, a controller, test equipment, an Internet-of-Things (IoT) device, and/or another electronic device.

Although specific components are used to describe electronic device 900, in alternative embodiments, different components and/or subsystems may be present in electronic device 900. For example, electronic device 900 may include one or more additional processing subsystems, memory subsystems, networking subsystems, and/or display subsystems. Additionally, one or more of the subsystems may not be present in electronic device 900. Moreover, in some embodiments, electronic device 900 may include one or more additional subsystems that are not shown in FIG. 9. Also, although separate subsystems are shown in FIG. 9, in some embodiments some or all of a given subsystem or component can be integrated into one or more of the other subsystems or component(s) in electronic device 900. For example, in some embodiments program instructions 922 are included in operating system 924 and/or control logic 916 is included in interface circuit 918.

Moreover, the circuits and components in electronic device 900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of electronic device 900 and/or networking subsystem 914. The integrated circuit may include hardware and/or software mechanisms that are used for transmitting wireless signals from electronic device 900 and receiving signals at electronic device 900 from other electronic devices. Aside from the mechanisms herein described, radios are generally known in the art and hence are not described in detail. In general, networking subsystem 914 and/or the integrated circuit can include any number of radios. Note that the radios in multiple-radio embodiments function in a similar way to the described single-radio embodiments.

In some embodiments, networking subsystem 914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Ethernet and a Wi-Fi communication protocol as an illustrative example, in other embodiments a wide variety of communication protocols and, more generally, wired and/or wireless communication techniques may be used. Thus, the user-interface techniques and/or the communication techniques may be used with a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the user-interface techniques and/or the communication techniques may be implemented using program instructions 922, operating system 924 (such as a driver for interface circuit 918) or in firmware in interface circuit 918. Alternatively or additionally, at least some of the operations in the user-interface techniques and/or the communication techniques may be implemented in a physical layer, such as hardware in interface circuit 518.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the user-interface techniques and/or the communication techniques, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer network device, comprising:
an interface circuit;
a processor; and
memory configured to store program instructions for multiple user interfaces and a shared messaging module, wherein, when executed by the processor, the program instructions cause the computer network device to perform operations comprising:
executing the program instructions for the user interfaces and the shared messaging module, wherein a given user interface comprises an agent corresponding to an application, and wherein the user interfaces use different, unique message formats from each other;
when a message associated with the application is received via a user interface in the user interfaces, extracting, using the corresponding agent in the user interface, a command or operation from the message;
translating, using the shared messaging module, the command or operation into a common format of the application, where the common format is different from the message formats, and the translating comprises translating the command or operation using an associated key-value pair and a predetermined application programing interface (API) associated with the command or operation, and wherein the predetermined API is in a set of predetermined APIs; and
providing, using the shared messaging module, the translated command or operation addressed to the application via a single communication path associated with the application and the agents for the application in the user interfaces.

2. The computer network device of claim 1, wherein the computer network device comprises an access point, a switch, or a router.

3. The computer network device of claim 1, wherein external communication with the user interfaces comprises non-inter-process communication, and the communication between the shared messaging module and at least the application comprises inter-process communication.

4. The computer network device of claim 1, wherein the application is associated with configuration of the computer network device, monitoring of the computer network device, or both.

5. The computer network device of claim 1, wherein the application is associated with a computer or a computer system.

6. The computer network device of claim 1, wherein, when there are multiple applications, the given user interface comprises multiple agents corresponding to the applications.

7. The computer network device of claim 1, wherein the application does not have information specifying which of the user interfaces provided the command or the operation.

8. The computer network device of claim 1, wherein the common format is not based on a data model associated with one of the user interfaces.

9. The computer network device of claim 1, wherein the user interfaces comprise one or more of: a command line interface, a web-based user interface, RESTConf, or a simple network management protocol (SNMP) interface.

10. A non-transitory computer-readable storage medium for use in conjunction with a computer network device, the computer-readable storage medium storing program instructions for user interfaces and a shared messaging module that, when executed by the computer network device, causes the computer network device to perform operations comprising:
executing the program instructions for the user interfaces and the shared messaging module, wherein a given user interface comprises an agent corresponding to an application, and wherein the user interfaces use different, unique message formats from each other;
when a message associated with the application is received via a user interface in the user interfaces, extracting, using the corresponding agent in the user interface, a command or operation from the message;
translating, using the shared messaging module, the command or operation into a common format of the application, where the common format is different from the message formats, and the translating comprises translating the command or operation using an associated key-value pair and a predetermined application programing interface (API) associated with the command or operation, and wherein the predetermined API is in a set of predetermined APIs; and providing, using the shared messaging module, the translated command or operation addressed to the application via a single communication path associated with the application and the agents for the application in the user interfaces.

11. The non-transitory computer-readable storage medium of claim 10, wherein the computer network device comprises an access point, a switch, or a router.

12. The non-transitory computer-readable storage medium of claim 10, wherein external communication with the user interfaces comprises non-inter-process communication, and the communication between the shared messaging module and at least the application comprises inter-process communication.

13. The non-transitory computer-readable storage medium of claim 10, wherein the application is associated with configuration of the computer network device, monitoring of the computer network device, or both.

14. The non-transitory computer-readable storage medium of claim 10, wherein the application is associated with a computer or a computer system.

15. The non-transitory computer-readable storage medium of claim 10, wherein, when there are multiple applications, the given user interface comprises multiple agents corresponding to the applications.

16. The non-transitory computer-readable storage medium of claim 10, wherein the application does not have information specifying which of the user interfaces provided the command or the operation.

17. The non-transitory computer-readable storage medium of claim 10, wherein the common format is not based on a data model associated with one of the user interfaces.

18. A method for providing a command or an operation, comprising:

by a computer network device:

executing program instructions for user interfaces and a shared messaging module, wherein a given user interface comprises an agent corresponding to an application, and wherein the user interfaces use different, unique message formats from each other;

when a message associated with the application is received via a user interface in the user interfaces, extracting, using the corresponding agent in the user interface, the command or the operation from the message;

translating, using the shared messaging module, the command or operation into a common format of the application, where the common format is different from the message formats, and the translating comprises translating the command or operation using an associated key-value pair and a predetermined application programing interface (API) associated with the command or operation, and wherein the predetermined API is in a set of predetermined APIs; and providing, using the shared messaging module, the translated command or operation addressed to the application via a single communication path associated with the application and the agents for the application in the user interfaces.

19. The method of claim 18, wherein, when there are multiple applications, the given user interface comprises multiple agents corresponding to the applications.

20. The method of claim 18, wherein the common format is not based on a data model associated with one of the user interfaces.

* * * * *